(12) United States Patent
Pefkianakis et al.

(10) Patent No.: US 12,185,123 B2
(45) Date of Patent: Dec. 31, 2024

(54) SENSOR-ASSISTED ANTENNA AND BEAM SELECTION FOR WIRELESS COMMUNICATIONS

(71) Applicant: Apple Inc., Cupertino, CA (US)

(72) Inventors: Ioannis Pefkianakis, San Jose, CA (US); Madhusudan Chaudhary, Campbell, CA (US); Chia-Feng Lin, Santa Clara, CA (US); Satish Doraiswamy, Cupertino, CA (US); Prashant H. Vashi, San Jose, CA (US); Sai Sravan Bharadwaj Karri, Morgan Hill, CA (US); Guillaume Monghal, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 17/572,145

(22) Filed: Jan. 10, 2022

(65) Prior Publication Data

US 2022/0225118 A1    Jul. 14, 2022

Related U.S. Application Data

(60) Provisional application No. 63/135,503, filed on Jan. 8, 2021.

(51) Int. Cl.
*H04W 16/28* (2009.01)
*H04W 64/00* (2009.01)

(52) U.S. Cl.
CPC ......... *H04W 16/28* (2013.01); *H04W 64/006* (2013.01)

(58) Field of Classification Search
CPC ....... H04W 16/24; H04W 16/28; H04W 4/02; H04W 64/00; H04W 64/003;
(Continued)

(56) References Cited

U.S. PATENT DOCUMENTS

| 8,526,961 | B2 * | 9/2013 | Sanders | ................ H04W 64/00 455/456.1 |
| 10,243,276 | B2 * | 3/2019 | Ford | ........................ H01Q 3/36 |

(Continued)

FOREIGN PATENT DOCUMENTS

| KR | 10-2020-0026133 | 3/2020 |
| WO | WO 2020/151643 | 7/2020 |

OTHER PUBLICATIONS

Alrabeiah et al., "Millimeter Wave Base Stations with Cameras: Vision Aided Beam and Blockage Prediction," IEEE Vehicular Technology Conference, Oct. 2019, 6 pages.
(Continued)

*Primary Examiner* — Quochien B Vuong
(74) *Attorney, Agent, or Firm* — Fish & Richardson P.C.

(57) ABSTRACT

A wireless device is configured to select a beam and/or an antenna based on detection a detected position and/or orientation of the device relative to a remote device. The device obtains motion data indicating a change in position or orientation of the wireless device. The device determines its pose relative to the remote device. The device accesses a coverage map that associates, for each potential pose for the device with respect to the remote device: an antenna for communicating with the remote device and/or a beam for communicating with the remote device. The device selects a particular antenna and/or a particular beam for communicating with the remote device; and causes transmission or reception of data to or from the remote device by the particular antenna and/or the particular beam.

37 Claims, 9 Drawing Sheets

(58) Field of Classification Search
CPC ... H04W 64/006; H04W 72/00; H04W 72/02; H04W 72/04; H04W 72/046; H04W 72/20; H04W 72/21; H04W 72/23; H04B 7/0608; H04B 7/0617; H04B 7/0691; H04B 7/0695
See application file for complete search history.

(56) References Cited

U.S. PATENT DOCUMENTS

| | | | | |
|---|---|---|---|---|
| 10,849,034 | B1* | 11/2020 | Chisu | H04W 64/006 |
| 11,463,980 | B2* | 10/2022 | Shi | H04B 7/0695 |
| 11,575,452 | B2* | 2/2023 | Merlin | H04W 4/025 |
| 11,672,042 | B2* | 6/2023 | Jia | H04W 64/003 370/329 |
| 2020/0382189 | A1 | 12/2020 | Chen et al. | |
| 2020/0404644 | A1 | 12/2020 | Zhu et al. | |
| 2023/0035996 | A1 | 2/2023 | Pefkianakis et al. | |
| 2023/0044590 | A1 | 2/2023 | Pefkianakis et al. | |

OTHER PUBLICATIONS

Developer.apple.com [online], "Getting Raw Accelerometer Events," Jun. 16, 2019, retrieved on Aug. 19, 2022, retrieved from URL<https://developer.apple.com/documentation/coremotion/getting_raw_accelerometer_events>, 8 pages.

Developer.apple.com [online], "Getting Raw Gyroscope Events," Jun. 16, 2019, retrieved on Aug. 19, 2022, retrieved from URL<https://developer.apple.com/documentation/coremotion/getting_raw_gyroscope_events>, 8 pages.

Johnson, "5G New Radio in Bullets", 1st Edition, Jul. 28, 2019, 590 pages (abstract only), 7 pages.

Nitsche et al., "Steering with Eyes Closed: mm-Wave Beam Steering without In-Band Measurement," IEEE INFOCOM'15, Apr. 26, 2015-May 1, 2015, pp. 2416-2424.

Pefkianakis et al., "Accurate 3D Localization for 60 GHz Networks," ACM SenSys'2018, Nov. 4-7, 2018, pp. 120-131.

Sur et al., "BeamSpy: Enabling Robust 60 GHz Links Under Blockage," USENIX NSDI'16, Mar. 16-18, 2016, Santa Clara, CA, 15 pages.

Sur et al., "WiFi-Assisted 60 GHz Wireless Networks," MobiCom'17, Oct. 16-20, 2017, 14 pages.

Wang et al., "X-Array: Approximating Omnidirectional Millimeter-Wave Coverage Using an Array of Phased Arrays," ACM MobiCom'20, Sep. 21-25, 2020, 14 pages.

Wei et al., "Pose Information Assisted 60 GHz Networks: Towards Seamless Coverage and Mobility Support," ACM MobiCom'17, Oct. 16-20, 2017, 14 pages.

Wei et al., "Facilitating Robust 60 GHz Network Deployment By Sensing Ambient Reflectors," USENIX NSDI'17, Mar. 27-29, 2017, 15 pages.

Wikipedia.org [online], "MUSIC (algorithm)," Jul. 14, 2022, retrieved on Aug. 19, 2022, retrieved from URL<https://en.wikipedia.org/wiki/MUSIC_(algorithm)>, 5 pages.

Yang et al., "Sensor-assisted Codebook-based Beamforming for Mobility Management in 60 GHz WLANs," IEEE MASS'15, Oct. 19-22, 2015, pp. 333-341.

Partial European Search Report in European Appln. No. 22181998.0, dated Dec. 16, 2022, 17 pages.

\* cited by examiner

SENSOR-ASSISTED ANTENNA AND BEAM SELECTION FOR WIRELESS COMMUNICATIONS

CLAIM OF PRIORITY

This application claims priority under 35 U.S.C. § 119(e) to U.S. patent application Ser. No. 63/135,503, filed on Jan. 8, 2021, the entire contents of which are hereby incorporated by reference.

TECHNICAL FIELD

This disclosure relates generally to wireless communications.

BACKGROUND

Wireless devices can include phased array antennas for transmitting signals to and receiving signals from remote devices (e.g., in a wireless network). A phased array includes a computer-controlled array of antennas that creates a beam of radio waves that can be electronically steered to point in different directions without moving the antennas.

Beamforming or spatial filtering is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends (e.g., by phased array antennas) in order to achieve spatial selectivity. Beamforming allows mmWave devices to steer radio frequency (RF) energy at a particular direction, overcoming mmWave propagation loss. Beams are typically fixed and designed a-priori in codebooks such as phase-amplitude combinations for antenna elements.

SUMMARY

This application describes systems and processes for sensor-assisted antenna and beam selection for wireless networks. Generally, the wireless networks include transmissions using the millimeter wave (mmWave) spectrum. For example, the mmWave spectrum can be used for Fifth Generation (5G) and/or Long Term Evolution (LTE) networks for mmWave frequency ranges (e.g., frequency range 2 (FR2), frequency range 3 (FR3), etc.) transmissions from base stations (e.g., next generation nodes (gNB)) or to and from client devices (e.g., mobile devices described throughout this description). In general, FR2 transmissions are between 24.25 GHz to 52.6 GHz. Generally, mmWave high bandwidth (e.g., about 400 MHz) transmissions have a relatively high propagation loss. For example, mmWave transmissions can have a 20 dB loss relative to sub 6 GHz bands, such as those used for frequency range 1 (FR1) transmissions.

To overcome this loss, mmWave-enabled devices described herein are configured for beamforming, beam management, and antenna selection based on sensor feedback of one or more sensors of the mmWave-enabled device. Beamforming enables a device to steer the radiofrequency (RF) energy in a particular direction. The transmitting device forms a beam by varying an amplitude and/or a phase of one or more elements of a phased array antenna. Generally, the transmitting device generates a beam based on predefined phase-amplitude combinations for each antenna of the array to ensure that a narrow beam of relatively high power is transmitted in a desired direction with respect to the phased array antenna. Beam management enables a device to identify an optical beam for transmission in each of the uplink and downlink directions. Antenna selection enables an mmWave-enabled device (e.g., a user equipment (UE)) to ensure high-speed connectivity by improving wireless coverage for a given uplink or downlink transmission. The systems and processes for sensor-assisted antenna and beam selection are configured to use feedback from sensors on the mmWave-enabled devices to optimize beamforming, beam management, and antenna selection and therefore mitigate propagation loss, increase efficiency in beam determination regarding time and/or resources, and improve link performance.

The sensors on the mmWave-enabled devices are configured to provide data indicates how the device has moved in an environment. The motion data from the sensors enables the device to estimate beamforming parameters and antenna selection for an optimal connection based on previous data indicating a strong signal. This allows the device to estimate optimal parameters for determining an antenna selection without performing a full sweep of the possible beams and antenna to test various combinations of beams and antenna for optimal performance. Therefore, the device can determine a likely candidate for a relatively high-performance connection in a quick manner without the bandwidth overhead of performing a sweep of beam and antenna combinations.

The systems and processes described in this document enable one or more of the following advantages. The systems and processes are configured to instantly (or nearly instantly) identify a best beam and antenna panel for a UE with a relatively low scanning overhead. Generally, beam and antenna selection algorithms are configured to identify best beam and antenna panel settings at runtime. However, beam selection and antenna selection can result in relatively high scanning transmission overheads. For example, mmWave devices can be equipped with multiple antenna panels (e.g., three or more). Each antenna supports tens of beams. As such, scanning each available beam for each antenna panels can require tens of milliseconds, which adds prohibitive overheads to the network. This is especially prohibitive for augmented reality/virtual reality (AR/VR) applications, which have 1-2 millisecond latency requirements. Frequent beam and antenna scanning is not optimal practical for wireless devices. The processes and systems for sensor-assisted antenna and beam selection enable selection of the beam and antenna using a reduced frequency of scanning and thus with a reduced network overhead (and thus a reduced communication latency).

The processes and systems for sensor-assisted antenna and beam selection enable a UE or other similar device to overcome changes to the environment of the UE and allow for increased mobility of the UE (which can represent a change in an environment of the UE). For example, a device using mmWave communication may frequently adjust beam and antenna selection in response to physical changes in the environment of the device (e.g., moving cars or trees) or movement of the device. Changes in the environment may cause blockages in a communication path of the UE or changes in location of the remote device (e.g., a node) in communication with the UE. This can cause the UE and/or node to frequently adjust its beams to achieve a better performance for a communications link. The processes and systems for sensor-assisted antenna and beam selection enable the mmWave devices in the environment to quickly (e.g., instantly or nearly instantly) determine an optimal beam selection and/or antenna selection (when applicable) for improved performance on the communications link in response to these environmental changes and/or movement of one or both of the communicating devices.

The one or more advantages previously described can be enabled by one or more embodiments.

In a general aspect, a process includes obtaining motion data from one or more motion sensors coupled to a wireless device, the motion data indicating a change in position or orientation of the wireless device. The process includes determining, based on the motion data, a pose of the wireless device relative to a remote device. The process includes selecting a particular antenna or a particular beam for communicating with the remote device based on a coverage map that associates, for each pose of a plurality of poses of the wireless device with respect to the remote device: an antenna for communicating with the remote device; a beam for communicating with the remote device; or both the antenna and the beam configuration for communicating with the remote device. The process includes causing transmission or reception of data to or from the remote device by the particular antenna or the particular beam.

In an embodiment, the process includes determining an initial pose of the wireless device with respect to the remote device using angle of arrival (AoA) data, wherein the pose of the wireless device relative to the remote device is based on the motion data indicative of the change in the position or the orientation of the wireless device from the initial pose.

In an embodiment, the motion data is indicative of no change to the position or orientation of the wireless device over a period of time. The process includes determining that one or more metrics of a communication channel between the wireless device and the remote device fail to satisfy one or more respective thresholds; in response to determining, identifying an angle of arrival (AoA) value of a strongest signal from the remote device; and identifying, from the coverage map, the particular beam and the particular antenna as being associated with the AoA value in the coverage map.

In an embodiment, the one or more metrics include at least one of a signal to noise (SNR) ratio of a signal received from the remote device, a delay spread value of the signal, and a magnitude of a change in the AoA of the signal.

In an embodiment, the coverage map indicates that the particular antenna and the particular beam represent the highest gain for causing transmission of data to the remote device or receiving additional data from the remote device.

In an embodiment, the one or more motion sensors comprise at least an accelerometer, a gyroscope, or both the accelerometer and the gyroscope.

In an embodiment, the wireless device and the remote device are configured for mmWave communication using frequency range 2 (FR2).

In an embodiment, selecting the particular antenna and the particular beam for communicating with the remote device is performed with a latency of less than 2 milliseconds.

In an embodiment, the process includes retrieving motion data periodically to determine if the wireless device is moving or is static.

In an embodiment, the wireless device comprises at least three antenna arrays, and wherein each antenna array includes at least 10 beam configurations.

In an embodiment, determining, based on the motion data, the pose of the wireless device relative to the remote device includes determining one or more of a translational motion or a rotational motion of the wireless device exceeds a motion threshold; and in response to determining that the motion threshold is exceeded, accessing the coverage map.

In an embodiment, the process includes comparing the change in position or orientation of the wireless device to a threshold change value; and in response to the comparing, accessing the coverage map when the change exceeds the threshold.

In an embodiment, the process includes detecting that a signal strength received from the remote device is below a threshold signal strength; and in response to detecting, obtaining the motion data.

In an embodiment, the process includes selecting a particular antenna and or a particular beam for communicating with the remote device based on the coverage map; and causing transmission or reception of data to or from the remote device by the particular antenna and the particular beam.

In a general aspect, a wireless device includes at least one motion sensor; one or more antenna arrays each configured for at least two beam configurations; one or more processors; and a non-transitory computer-readable storage medium storing instructions which, when executed by the one or more processors, cause the one or more processors to perform operations. In an embodiment, the operations include obtaining motion data from the at least one motion sensor, the motion data indicating a change in position or orientation of the wireless device. In an embodiment, the operations include determining, based on the motion data, a pose of the wireless device relative to a remote device. In an embodiment, the operations include selecting a particular antenna and a particular beam for communicating with the remote device based on a coverage map that associates, for each pose of a plurality of poses of the wireless device with respect to the remote device: an antenna array of the one or more antenna arrays for communicating with the remote device; a beam for communicating with the remote device; or both the antenna and the beam for communicating with the remote device. In an embodiment, the operations include causing transmission of data to the remote device by the particular antenna and the particular beam.

In an embodiment, the operations include determining an initial pose of the wireless device with respect to the remote device using angle of arrival (AoA) data, wherein the pose of the wireless device relative to the remote device is based on the motion data indicative of the change in the position or the orientation of the wireless device from the initial pose.

In an embodiment, the motion data is indicative of no change to the position or orientation of the wireless device over a period of time, and the operations further comprise: determining that one or more metrics of a communication channel between the wireless device and the remote device fail to satisfy one or more respective thresholds; in response to determining, identifying an angle of arrival (AoA) value of a strongest signal from the remote device; and identifying, from the coverage map, the particular beam and the particular antenna as being associated with the AoA value in the coverage map.

In an embodiment, the one or more metrics include at least one of a signal to noise (SNR) ratio of a signal from the remote device, a delay spread value of the signal, and a magnitude of a change in the AoA of the signal.

In an embodiment, the coverage map indicates that the particular antenna and the particular beam represent the highest gain for causing transmission of data to the remote device or receiving additional data from the remote device.

In an embodiment, the one or more motion sensors comprise at least an accelerometer, a gyroscope, or both the accelerometer and the gyroscope.

In an embodiment, the wireless device and the remote device are configured for mmWave communication using frequency range 2 (FR2).

In an embodiment, the operations include comparing the change in position or orientation of the wireless device to a threshold change value; in response to the comparing, accessing the coverage map when the change exceeds the threshold.

In an embodiment, the operations include detecting that a signal strength received from the remote device is below a threshold signal strength; and in response to detecting, obtaining the motion data.

In an embodiment, the operations include selecting a particular antenna and or a particular beam for communicating with the remote device based on the coverage map; and causing transmission or reception of data to or from the remote device by the particular antenna and the particular beam.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
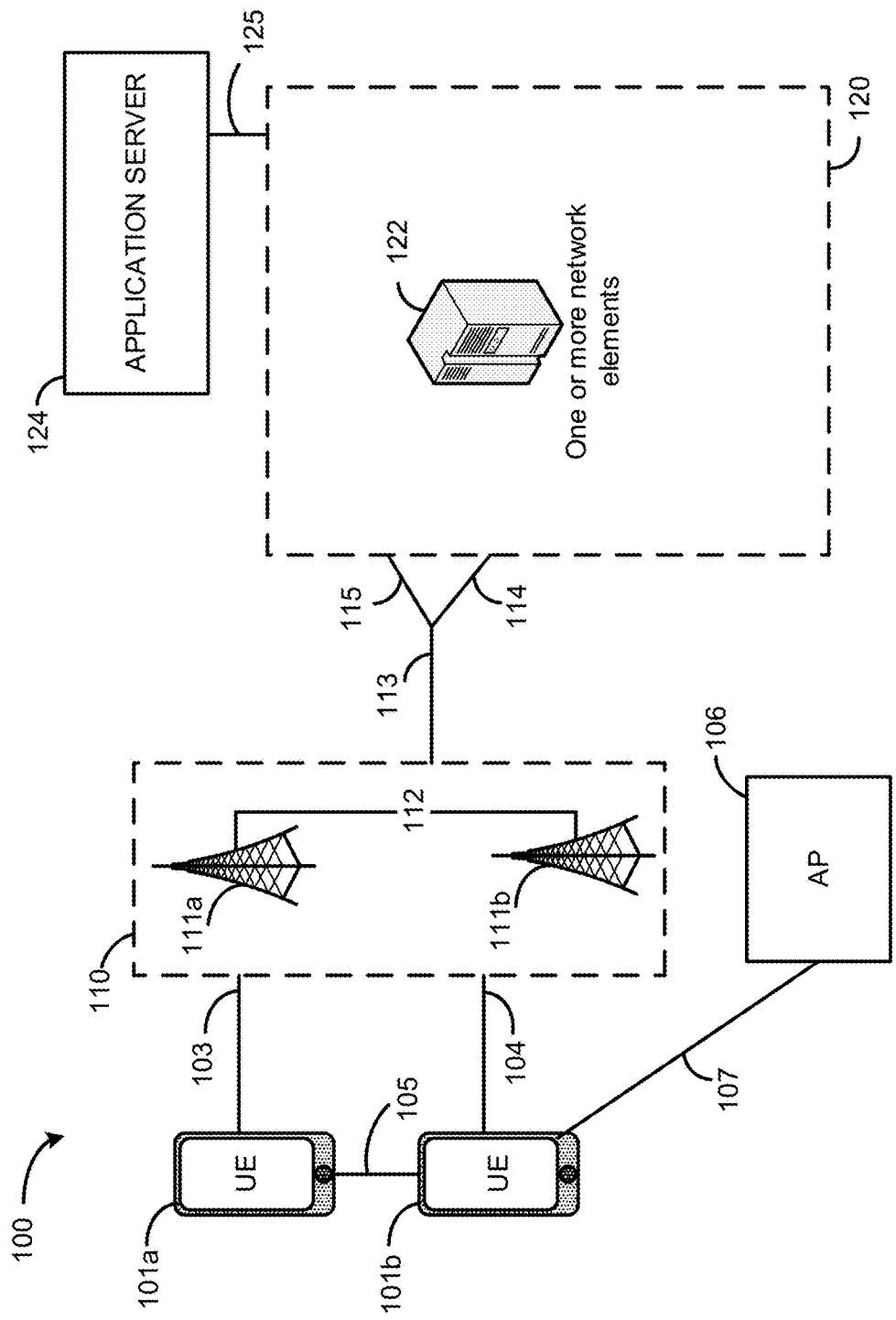
FIG. 1 illustrates an example wireless communication system, according to various embodiments herein.

The techniques described here enable a wireless device to perform beam selection, antenna selection, or both beam and antenna selection in response to changes to the channel of a communications link. A device includes one or more sensors that provide motion data to the device. The device is configured to perform beamforming, select an antenna for transmission, or both perform beamforming and select an antenna for transmission in response to receiving the motion data. This enables the device to perform beamforming and antenna selection to improve communication performance using less bandwidth overhead and with less latency than performing full scanning of beams an antenna of the device.

Generally, the beam and antenna selection are performed to improve communication bandwidth in the context of mmWave systems (e.g., using FR2 frequencies, FR3 frequencies, or other mmWave frequencies). mmWave communication links have a relatively high propagation loss over long distances (e.g., over 10s or 100s of meters) relative to losses for FR1 links. To mitigate propagation loss and improve performance of a communication link, mmWave-enabled devices are configured for beamforming, beam management, and antenna selection based on sensor feedback of one or more sensors of the mmWave-enabled device.

Beamforming enables a device to steer the radiofrequency (RF) energy in a particular direction. The transmitting device forms a beam by varying an amplitude and/or a phase of one or more elements of a phased array antenna. Generally, the transmitting device generates a beam based on predefined phase-amplitude combinations for each antenna of the array to ensure that a narrow beam of relatively high power is transmitted in a desired direction with respect to the phased array antenna.

Beam management enables a device to identify an optimal beam for transmission in each of the uplink and downlink directions. In an example, for 5G NR mmWave transmissions, a node (e.g., a gNB) transmits synchronization signals periodically (e.g., between 5 to 160 millisecond (monitoring system) periods) to identify best transmit and receive beams. This includes an initial beam training step using multiple beams. In this first step, a wide sweeping range is covered using wider beam widths. A second step includes a beam refinement step. In this step, the UE sweeps over narrower beams over a narrower range than in the first step. This enables the UE to hone in on the desired beam direction. In the third step, the device is configured for beam refinement. In the beam refinement step, a user equipment (UE) performs tuning of the receive angle for the beam, and the node transmits using a fixed beam. The UE measures different signal strengths until an optimal configuration of the beams is found. In an example, for a 802.11ad/ay mmWave transmission, an access point (AP) and a wireless device (e.g., a UE) train their respective beams during sector level sweep (SLS) and the beam refinement process (BRP) as defined in 802.11 standards.

Antenna selection enables a device (e.g., a UE) to ensure high-speed connectivity by improving wireless coverage for a given uplink or downlink transmission. In an example, either of a blockage of a first antenna or an antenna misalignment can cause throughput levels to decrease relative to an ideal transmission environment. In this case, the UE is configured to select from a plurality of phased antenna arrays (also called antenna panels).

The mmWave-enabled devices include one or more sensors configured to provide motion data. The motion data indicates how the device has moved in an environment. The motion data from the sensors enables the device to estimate beamforming parameters and antenna selection for an optimal connection based on previous data indicating a strong signal. This allows the device to estimate optimal parameters for beamforming an antenna selection without performing a full sweep of the possible beams and antenna to test various combinations of beams and antenna for optimal performance. Therefore, the device can determine a likely candidate for a relatively high-performance connection in a quick manner without the bandwidth overhead of performing a sweep of beam and antenna combinations. For example, if an mmWave-enabled device (e.g., a UE) is turned 180 degrees, the system can estimate that the direction of the beamforming may be 180 degrees from the previous direction for which optimal transmission performance was determined. Additional examples of this process are subsequently described in relation to the figures. The systems and processes described are compatible with any mmWave technologies (e.g., 802.11ad/ay, 5G, etc.). The system is lightweight and is configured to select a beam, antenna, or both independent of any antenna or beam scanning.

FIG. 1 illustrates an example wireless communication system 100. For purposes of convenience and without limitation, the example system 100 is described in the context of the LTE and 5G NR communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

The system 100 includes UE 101$a$ and UE 101$b$ (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some examples, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with an access network (AN) or radio access network (RAN) 110. In some examples, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols. In some examples, the UEs 101 may directly exchange communication data using an interface 105, such as a ProSe interface. The interface 105 may alternatively be referred to as a sidelink interface 105 and may include one or more logical channels, such as a physical sidelink control channel (PSCCH), a physical sidelink shared channel (PSSCH), a physical sidelink downlink channel (PSDCH), or a physical sidelink broadcast channel (PSBCH), or combinations of them, among others.

The UE 101$b$ is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi®) router. In this example, the AP 106 is shown to be connected to the Internet without connecting to the core network of the wireless system, as described in further detail below. In various examples, the UE 101$b$, RAN 110, and AP 106 may be configured to use LTE-WLAN aggregation (LWA) operation or LTW/WLAN radio level integration with IPsec tunnel (LWIP) operation. The LWA operation may involve the UE 101$b$ in RRC CONNECTED being configured by a RAN node 111$a$, 111$b$ to utilize radio resources of LTE and WLAN. LWIP operation may involve the UE 101$b$ using WLAN radio resources (e.g., connection 107) using IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111$a$ and 111$b$ (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some examples, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some examples, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some examples, an individual RAN node 111 may represent individual gNB distributed units (DUs) that are connected to a gNB central unit (CU) using individual F1 interfaces (not shown in FIG. 1). In some examples, the gNB-DUs may include one or more remote radio heads or RFEMs (see, e.g., FIG. 2), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some examples, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

Any of the RAN nodes 111 can terminate the air interface protocol and can be the first point of contact for the UEs 101. In some examples, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some examples, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink and ProSe or sidelink communications), although the scope of the techniques described here not limited in this respect. The OFDM signals can comprise a plurality of orthogonal subcarriers.

In some examples, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

In some examples, the UEs 101 and the RAN nodes 111 communicate (e.g., transmit and receive) data over a licensed medium (also referred to as the "licensed spectrum" or the "licensed band") and an unlicensed shared medium (also referred to as the "unlicensed spectrum" or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

Figure 2:
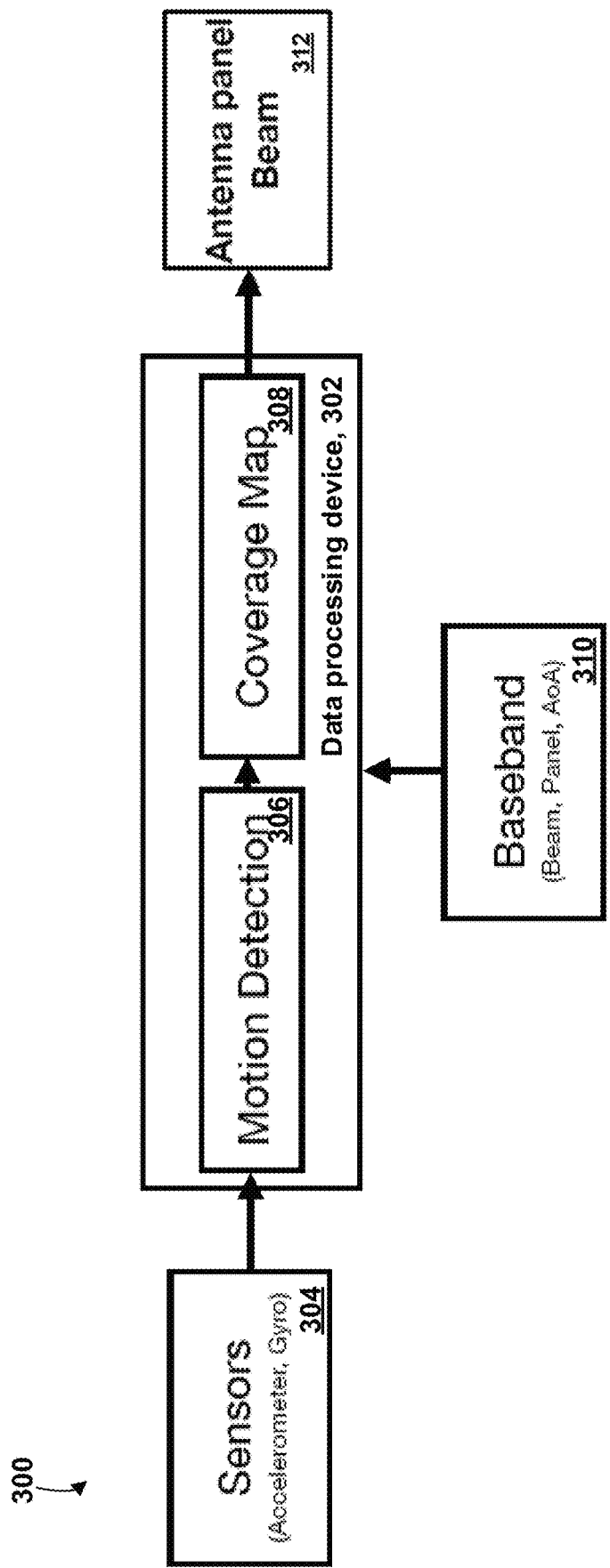
FIG. 2 illustrates an example of a platform or device configured for sensor-assisted antenna and beam selection in accordance with some implementations of the present disclosure.

FIG. 2 illustrates an example of a platform 300 (or "device 300"). In some examples, the computer platform 300 may be suitable for use as UEs 101 or any other component or device discussed herein. The platform 300 may include any combinations of the components shown in the example. The components of platform 300 (or portions thereof) may be implemented as integrated circuits (ICs), discrete electronic devices, or other modules, logic, hardware, software, firmware, or a combination of them adapted in the computer platform 300, or as components otherwise incorporated within a chassis of a larger system. The block diagram of FIG. 2 is intended to show a high level view of components of the platform 300. However, in some examples, the platform 300 may include fewer, additional, or alternative components, or a different arrangement of the components shown in FIG. 2.

The data processing device 302 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the data processing device 302 may be coupled with or may include memory/storage elements and may be configured to execute instructions stored in the memory or storage to enable various applications or operating systems to run on the system 300. In some examples, the memory or storage elements may be on-chip memory circuitry, which may include any suitable volatile or non-volatile memory, such as DRAM, SRAM, EPROM, EEPROM, Flash memory, solid-state memory, or combinations of them, among other types of memory.

The processor(s) of data processing device 302 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some examples, the data processing device 302 may include, or may be, a special-purpose processor/controller to carry out the techniques described herein.

As examples, the processor(s) of data processing device 302 may include an Apple A-series processor. The processors of the data processing device 302 may also be one or more of an Intel® Architecture Core™ based processor, such as a Quark™, an Atom™ an i3, an i5, an i7, or an MCU-class processor, or another such processor available from Intel® Corporation, Santa Clara, Calif.; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the data processing device 302 may be a part of a system on a chip (SoC) in which the data processing device 302 and other components are formed into a single integrated circuit.

Additionally or alternatively, the data processing device 302 may include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some examples, the data processing device 302 may include logic blocks or logic fabric, and other interconnected resources that may be programmed to perform various functions, such as the procedures, methods, functions described herein. In some examples, the data processing device 302 may include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 310310 may be implemented, for example, as a solder-down substrate including one or more integrated circuits, a single packaged integrated circuit soldered to a main circuit board or a multi-chip module containing two or more integrated circuits.

The antenna beam panel 312 (also called a radio front-end module (RFEM)) may comprise a millimeter wave (mmWave) RFEM and one or more sub-mmWave radio frequency integrated circuits (RFICs). In some examples, the one or more sub-mmWave RFICs may be physically separated from the mmWave antenna beam panel 312. The RFICs may include connections to one or more antennas or antenna arrays, and the antenna beam panel 312 may be connected to multiple antennas. In some examples, both mmWave and sub-mmWave radio functions may be implemented in the same physical antenna beam panel 312, which incorporates both mmWave antennas and sub-mmWave. In some implementations, the mmWave functions implement the IEEE 802.11ad and 802.11ay standards.

The platform 300 may also include interface circuitry (not shown) for connecting external devices with the platform 300. The external devices connected to the platform 300 using the interface circuitry include sensor circuitry 221 and electro-mechanical components (EMCs) 222, as well as removable memory devices coupled to removable memory circuitry 223.

The sensor circuitry 304 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The system 300 includes one or more motion sensors 304. The sensors 304 are configured to generate motion data that represent how the UE is moving in an environment (e.g., relative to a remote device in communication with the UE). As previously described, the sensors 304 can include one or more accelerometers, one or more gyroscopes and/or other sensing elements. These sensors are further described in relation to FIG. 3. As the pose of the system 300 changes in an environment of the system, the sensors 304 capture the motion of the system and send the motion data to a motion detection module 306.

The data processing device 302 is configured to host the motion detection module 306 and a coverage map module 308. The motion detection module 306 is configured to determine, from the motion data of the sensors 304, how the device is moving in an environment. The motion detection module 306 can determine a new position and orientation (e.g., a pose) of the device relative to a prior pose of the device for which an optimal beam and antenna were selected. The updated pose can be provided to the coverage map module 308.

The coverage map module 308 is configured to select, based on the updated pose provided from motion detection module 306, a beam and an antenna of the panel 312 for transmitting or receiving data by the system 300. The selection of the beam and the antenna includes a particular configuration of a selected phased antenna array to generate a directional beam from that array panel. In an example, the data processing device 302 performs the selection process continuously or nearly continuously as the device moves in an environment. In some implementations, the data processing device 302 performs the selection process with the coverage map module 308 when motion is detected by the motion detection module 306. In some implementations, the data processing device 302 performs the selection process with the coverage map module 308 when performance drops below a threshold (e.g., when a blockage is detected).

Generally, the data processing device 302 is configured to identify that an in-use antenna and beam are performing poorly (e.g., below a performance threshold). For example, a signal strength, a bandwidth, or other link metric (e.g., retrieved from baseband feedback of the baseband module 310) is associated with a threshold value. When a value of the metric fails to satisfy the threshold value, the data processing device 302 is configured to identify and select a different, optimal antenna and beam for both transmission and reception, without scanning overhead (e.g., without scanning across some or all of the available antenna panels and beams). In some implementations, the data processing device 302 is configured to determine that the current antenna or beam (or both) will perform poorly in the future (e.g., in 10s of milliseconds). The data processing device 302 is configured to anticipate this performance drop and switch to an antenna, beam, or both for which a similar performance drop is not expected to occur.

The system 300 receives input from each of the sensors 304 and the baseband module 310. The baseband (BB) feedback can include signal-to-noise ratios (SNR), delay spread, angle of arrival (AoA), and similar link metrics. The feedback data available from the wireless baseband module 310 is used by the data processing device 302 to infer an orientation of wireless dominant paths. Wireless dominant paths include paths that signals follow from the transmitter to the receiver. The data processing device 302 uses the baseband module 310 feedback data to identify whether the in-use antenna panel, beam, or both are optimal. Generally, if the AoA data are not available for the system 300, the AoA is estimated by the data processing device 302.

Figure 3:
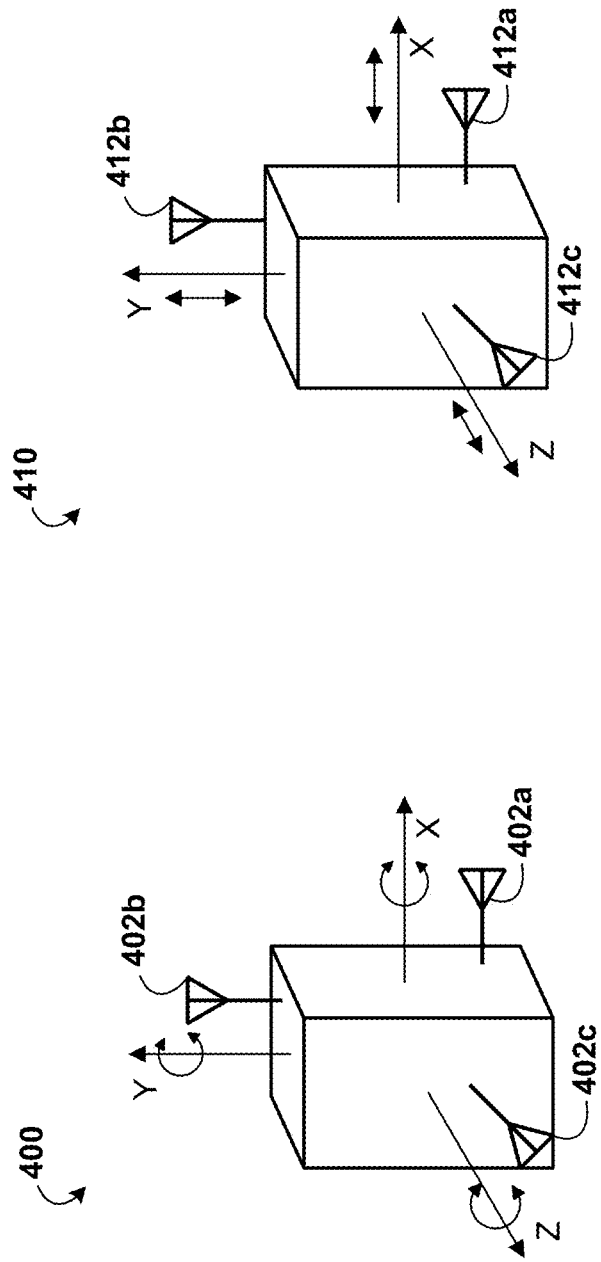
FIG. 3 illustrates an example device configured for multiuser trigger-based wireless communications in accordance with some implementations of the present disclosure.

Briefly turning to FIG. 3, devices 400 and 410 show examples of data gathered by sensors 304 of FIG. 2. For example, device 400 includes gyroscopes 402a, 402b, and 402c. The gyroscopes 402 are configured to measure a rate at which the device 400 rotates around a spatial axis including a rotational pitch, roll, and yaw, movement (e.g., in degrees or radians) of the device 400. Similarly, accelerometers 412a, 412b, and 412c of device 410 are configured to measure changes in velocity along x, y, and z axes (e.g., translational motion) for the device 410. Devices 400 and 410 are combinable into a single device including both gyroscope(s) 402a-c and accelerometer(s) 412a-c.

Returning to FIG. 2, the motion detection module 306 receives accelerometer motion data and identifies a translational movement (e.g., in centimeters) along each of the x, y, and z axes. The motion detection module 306 receives the gyroscope motion data and determines a rotation of the device around each of the x, y, and z axes. The result is an updated pose of the system 300 relative to a prior pose of the system. The initial pose of the system is determined relative to the remote device connected by the communications link. The initial pose can be determined based on AoA data (e.g., from the BB panel 310). In some implementations, a one-time beam sweep is performed to determine the AoA if the AoA data are not available, as subsequently described. The motion detection module 306 sends the motion data to the coverage map module 308 which is configured for antenna selection, beam selection, or both. The coverage map module 308 determines whether the change in pose is significant enough for beam or antenna panel switching to occur.

The coverage map module 308 performs selection of the antenna, beam, or both based on data from the BB panel 310 and the updated pose provided by the motion detection module 306. Because beam radiation patterns and antenna positions are predefined for a given device (e.g., device of system 300), the coverage map module 308 includes coverage map data. The coverage map data includes a highest gain antenna panel and beam identities for each available device orientation and position.

The coverage map module 308 generally selects a new antenna or beam based on two scenarios. A first scenario is a blockage scenario, in which Non-Line-of-Sight (NLOS) occurs between the system 300 and the remote device. A second scenario is a mobility scenario in which mobile device movement (e.g., of the system or of the remote device) causes antenna or beam misalignment or both antenna and beam misalignment.

In the blockage scenario, the coverage map module 308 detects that the connection is unstable. This can occur when one or more communication metrics (e.g., measured by baseband feedback panel 310) fails to satisfy a threshold. Generally, the wireless channel is more stable in LOS environment than in a blockage/NLOS environment. When channel stability is low, it is likely that there is a NLOS setting or scenario, and a beam or antenna switch (or both) may improve the channel stability. The data processing device 302 determines channel stability using the following metrics. The data processing device 302 determines channel stability is low by measuring an SNR drop and contextualizing the drop using a standard deviation value associated with the SNR. A blockage generally results in a significant initial SNR drop and subsequent high SNR deviations. The data processing device 302 determines that the channel stability is low by measuring delay spread of the signal. The delay spread is generally higher in NLOS/blockage settings in comparison to LOS settings. The data processing device 302 determines that the channel stability is low by measuring AoA changes. The AoA of the wireless dominant path generally changes when the wireless LOS path between two devices is blocked. In an example, a strongest path for the beam may become a reflected path rather than a direct path to the remote device, as subsequently described in relation to FIG. 6.

In some implementations, the SNR or delay spread values can increase and AoA can change due to mobility, rather than due to blockage. The system 300 is configured to differentiate blockage from mobility scenarios by checking the motion data from the sensors 304. A blockage scenario is determined when sensors indicate that the system 300 is static. In some implementations, the thresholds for the SNR deviation, delay spread, or any other channel metrics are determined by training models prior to run-time (e.g., using machine learning (ML) or similar models. For example, a machine learning model can be trained with data including various values of the metrics to classify the signal from the remote device as being blocked or unblocked for each of the various combinations of values. The machine learning model can be used to determine the appropriate thresholds for each of the one or more metrics to ensure that a characterization of a signal as being blocked or unblocked represents the correct scenario.

In the movement scenario, the coverage map module 308 is configured to determine a new antenna or beam (or both) for the system 300 based on the updated pose provided by the motion detection module 306. The change in pose is determined from a known pose of the system 300 relative to the remote device. The known pose can be determined (e.g., once) by using the BB feedback data, such as AoA of a signal. Generally, this can be determined based on where a highest receive power is present in the antenna array. For example, values of which phi or theta angles are associated with a highest power can be provided. Generally, the system associates the determined AoA with a peak beam of the remote transmitter. In other words, a strongest lobe estimated to be at the position of the determined AoA. From the motion data and the AoA, the updated pose is determined and a new position in a coverage map, subsequently described, is selected. Based on the position in the coverage map, a particular antenna and beam of the panel 312 are chosen for transmitting and/or receiving data in the communications link with the remote device.

As previously described, the system 300 uses baseband feedback to identify a current orientation of the dominant/strongest wireless paths to the remote device. When the directions of the wireless paths remain the same and the device moves, the data processing device 302 uses the motion data to identify the extent of the motion (e.g., in degrees). The data processing device 302 is configured to reference the current dominant signal path orientation and the motion to determine a new wireless path orientation and position (e.g., pose). The data processing device 302 uses a coverage map to identify a best antenna array panel and beam for the updated pose. In the mobility LOS scenario, the orientation of the dominant path remains the same while a system 300 orientation changes. The data processing device 302 is configured to fetch (or estimate) the AoA of the wireless dominant path P (θ, φ). Using the motion data, the coverage map module 306 identifies that the system 300 moved by Δ (θ', φ'). The coverage map module 306 is configured to periodically (e.g., every 10 milliseconds (ms)) fetch gyroscope motion data (e.g., roll, pitch, and yaw). Δ represents a difference between a current pose and the previous pose values. When a dominant path direction remains the same over these two iterations (a typical scenario), the dominant path corresponds to device pose P'=P+Δ. When updated device pose P' aligns with an antenna panel or beam other than the in-use antenna panel or beam, the coverage map module 306 is configured to cause the system 300 to use the new antenna panel and beam 312.

To determine the initial system 300 pose (e.g., orientation and position) relative to the remote device, the data processing device 302 determines or estimates an AoA of transmissions from the remote device. In some implementations, the AoA is provided by receive baseband hardware 310. In some implementations, the data processing device 302 estimates AoA from a channel matrix of signal metrics. For example, the data processing device 302 considers a peak of in-use beam to represent a direction of the dominant channel path and thus a current orientation in the beam coverage map. When multiple peaks are found, the data processing device 302 uses a centroid of the peaks to estimate the AoA. The direction of the dominant wireless path represents an orientation of the peak beam gain. As previously stated, AoA can be provided by the baseband module 310 or estimated from the channel matrix, such as by using a high-resolution direction-finding algorithm based on the eigenvalue decomposition of the sensor covariance matrix observed at the phased arrays (e.g., a multiple signal classification algorithm).

Figure 4A:
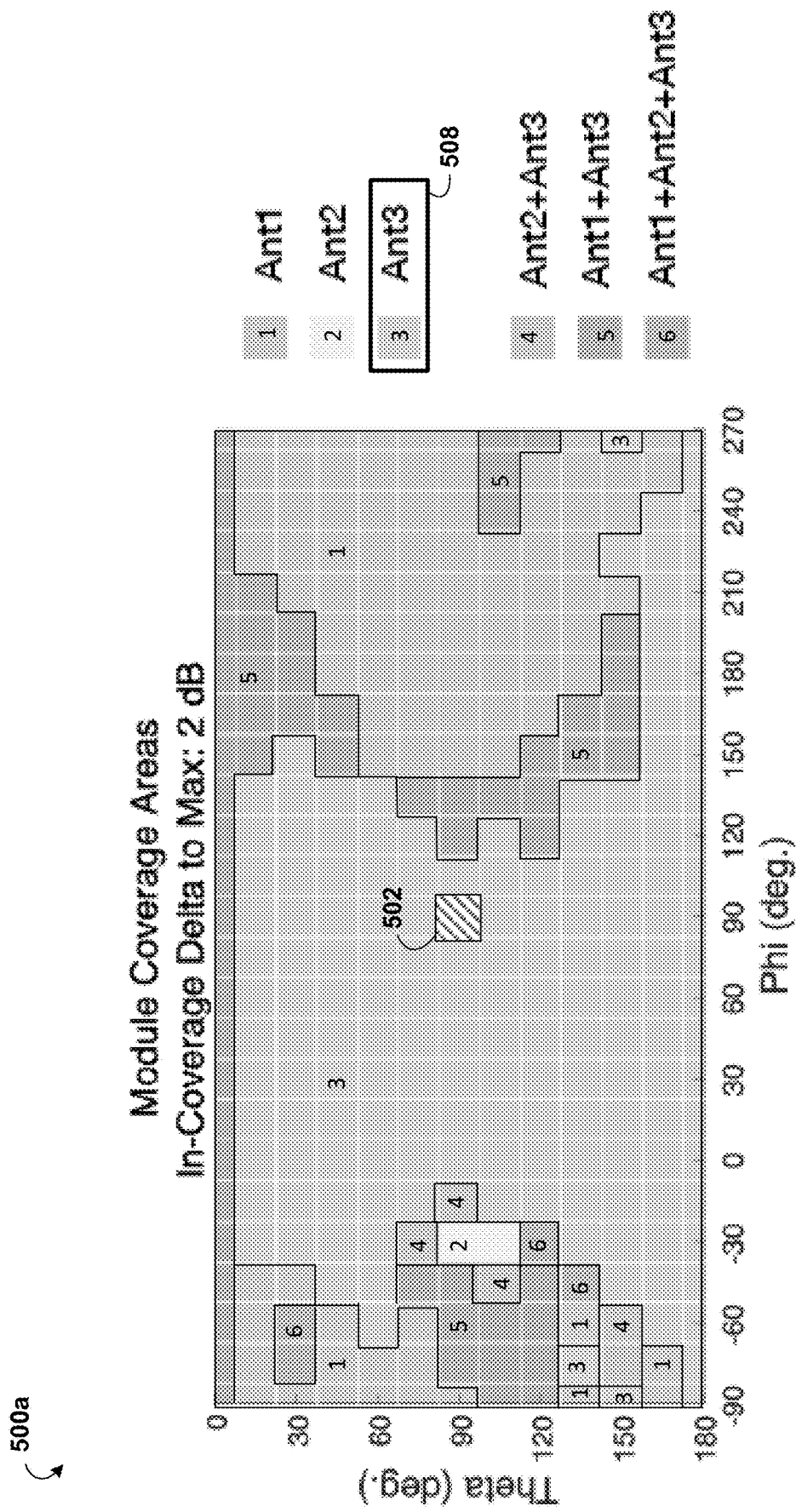
FIGS. 4A-4C illustrates an example of a coverage map for selection of one or more of an antenna and a beam in accordance with some implementations of the present disclosure.
Figure 4B:
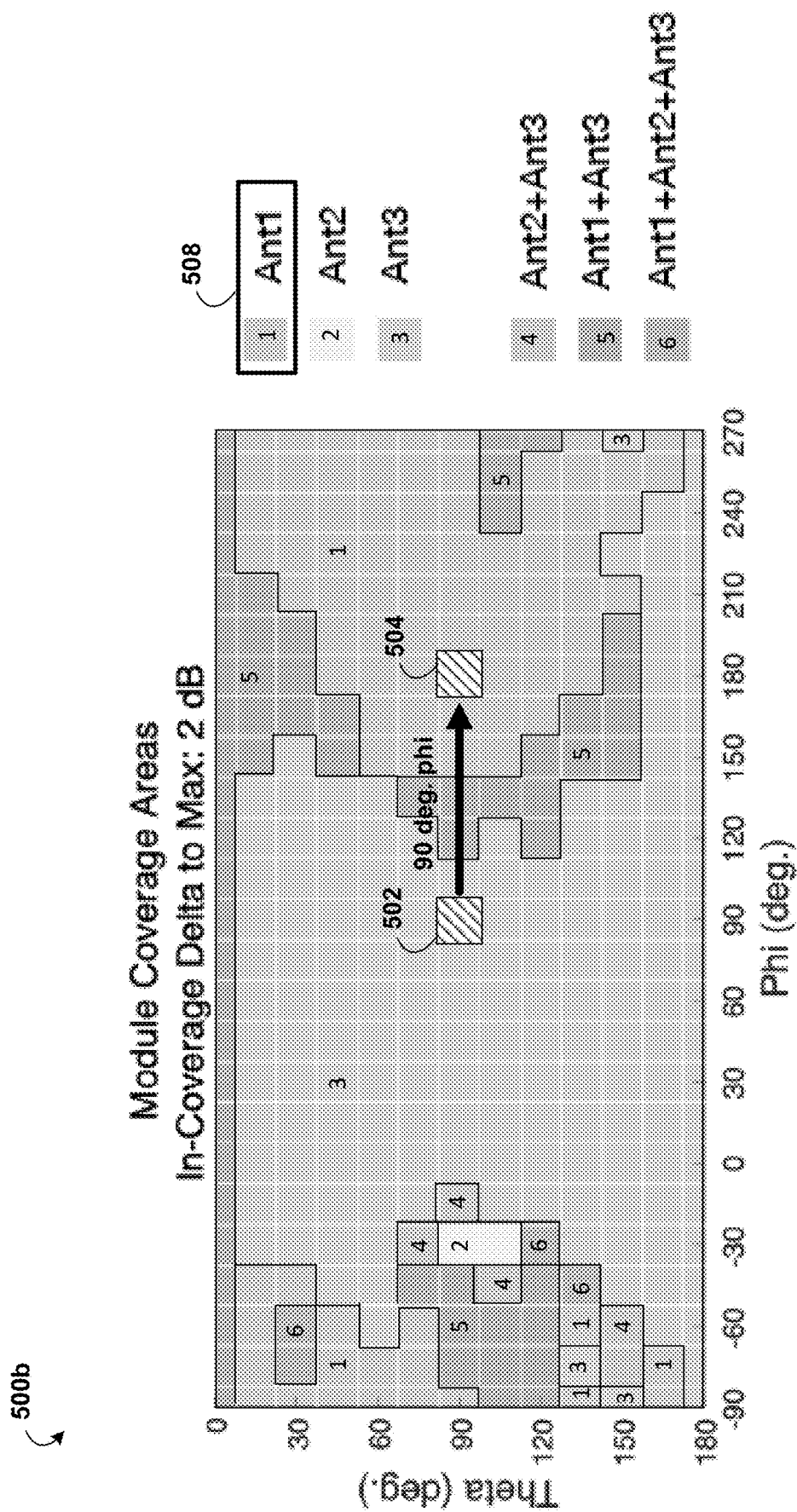
Figure 4C:
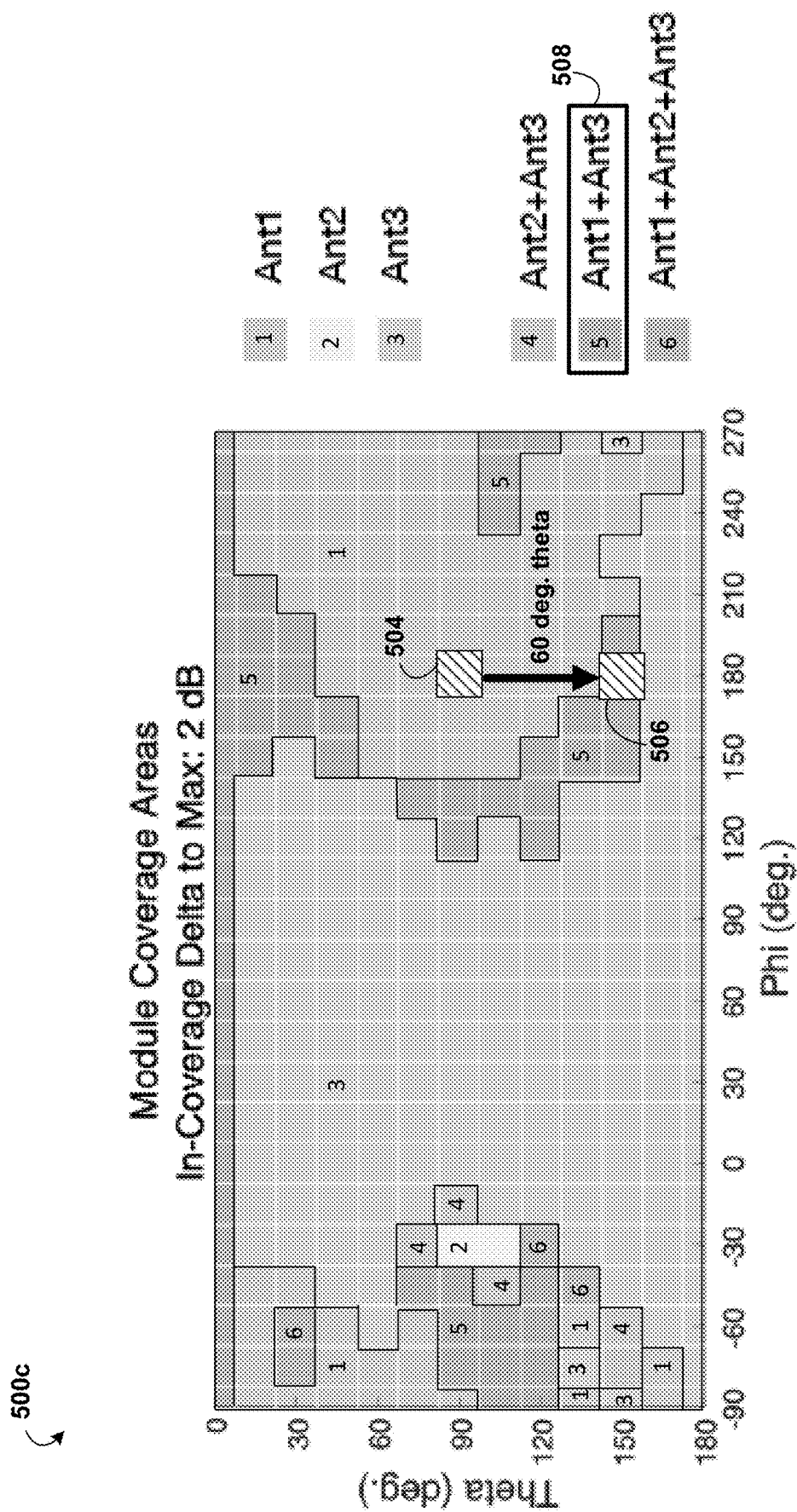

FIGS. 4A-4C illustrate an example of a coverage map 500a, 500b, 500c (collectively coverage map 500) for selection of one or more of an antenna and a beam in accordance with some implementations of the present disclosure. Generally, the coverage map module 308 of FIG. 2 is pre-loaded with the coverage map 500. The coverage map 500 specifies, for each particular AoA of the signal, a particular antenna and a particular beam for the antenna to optimize the channel. For example, the coverage map 500 can be computed in advance of runtime to identify a best antenna and beam at different device orientations towards the antenna of a base station.

The coverage map 500 is defined as a set of entries for each location. For example, a vector such as [phi, theta, best_antenna, best_beam] can represent angles for each best antenna and best beam. While the coverage map 500a of FIG. 4A shows only the optimal antenna arrays for angles theta and phi, a set of maps is used for each other pose value and for each beam of each antenna. The coverage map module 308 can reference the maps quickly (e.g., within 1 ms) and without requiring scanning of all available beams and antenna arrays of the system 300. In coverage map 500a, the optimal beam for each angle theta and phi is omitted for simplicity of illustration. In an example, the coverage map 500 includes beams and antenna selections for both rotational and translational motion of the motion data.

The coverage map 500 provides an identification of a best antenna panel and beam based on beam radiation patterns. The data processing device 302 uses this data in combination with a determination of the wireless multipath environment (e.g., azimuth and elevation direction of the wireless path(s)) to identify which beams "align" the best with the wireless dominant path(s). Because the beam radiation patterns and antenna positions are known for a particular device (e.g., a mobile device) in advance of runtime, the coverage map can be predefined to represent a highest gain antenna panel and beam for a given system 300 orientation relative to the remote device. As previously described, the data processing device 302 either estimates or reads from the hardware the AoA of the wireless dominant path(s) and identifies the antenna/beam from the coverage map 500 which aligns the best with that AoA.

In FIG. 4A, the coverage map 500a shows antenna selection for given value of theta and phi (pitch and roll) of a mobile device (e.g., system 300) with respect to a remote device (e.g., a base station). Based on the received or estimated AoA data, the initial orientation of the mobile device is found to be at about φ=90, θ=90 in the coverage map, corresponding to block 502. Here, antenna 3 is selected (508) as the optimal antenna. A similar coverage map (not shown) details the optimal beam for antenna 3 for use in this orientation.

Turning to FIG. 4B, coverage map 500b shows antenna selection for given value of theta and phi (pitch and roll) of a mobile device (e.g., system 300) with respect to a remote device (e.g., a base station). Here, the system 300 has changed orientation, rotating along φ to a value of φ=180, while θ and other position and orientations are static. The coverage map shifts from block 502 to block 504. Block 504 indicates (508) that antenna 1 is the optimal antenna for this orientation. A similar coverage map (not shown) details the optimal beam for antenna 1 for use in this orientation. As the pose at 502 is known already, the data processing device 302 does not need to estimate the AoA to select an optimal beam or antenna.

Turning to FIG. 4C, coverage map 500c shows antenna selection for given value of theta and phi (pitch and roll) of a mobile device (e.g., system 300) with respect to a remote device (e.g., a base station). Here, the system 300 has changed orientation, rotating along θ to a value of θ=180, while φ and other position and orientations are static. The coverage map shifts from block 504 to block 506. Block 506 indicates (508) that antenna 1 or antenna 3 can be an optimal antenna for this orientation. A similar coverage map (not shown) details the optimal beam for antenna 1 and the optimal beam for antenna 3 is for use in this orientation.

Figure 5:
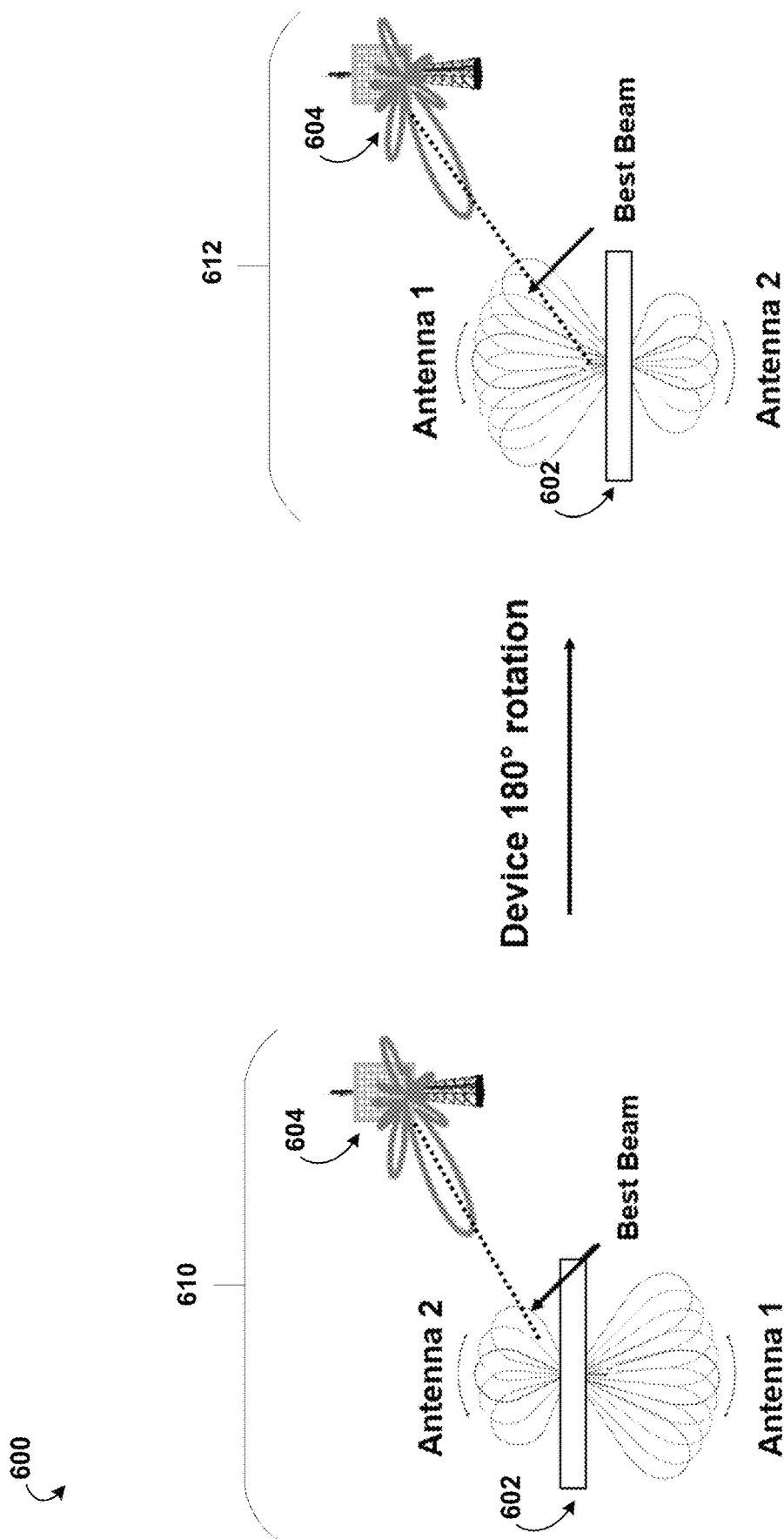
FIG. 5 illustrates an example of selection of one or more of an antenna and a beam based on sensor feedback in accordance with some implementations of the present disclosure.

FIG. 5 illustrates an example of an environment 600 for selection by a mobile device 602 of one or more of an antenna and a beam based on sensor feedback in accordance with some implementations of the present disclosure. In the example environment 600 of FIG. 5, a mobile device (e.g., a mobile phone) is in a first orientation 610 with respect to a remote device 604 (e.g., a gNB). Based on a full beam scan, the device 602 identifies a best beam of antenna 2 is used for receiving the signal. The mobile device 602 also determines the AoA. When the mobile device 602 is flipped 180 degrees, the mobile device 602 detects motion from gyroscopes coupled to the mobile device. Though the position is static, the orientation is changed, and therefore the mobile device 602 detects a motion scenario rather than a blocking scenario. Based on the motion data, the mobile device 602 determines an updated pose value. The mobile device 602, using a coverage map, determines that antenna 1 is now the optimal antenna, and selects a beam from antenna 1 for use in the communications link with the remote device 604. The mobile device 602 selects the new beam and antenna without performing another scan of the antennae and beams of the mobile device. The mobile device 602 switches from antenna 2 to antenna 1 with low latency (e.g., <1 ms) and without the bandwidth overhead of a beam scan.

Figure 6:
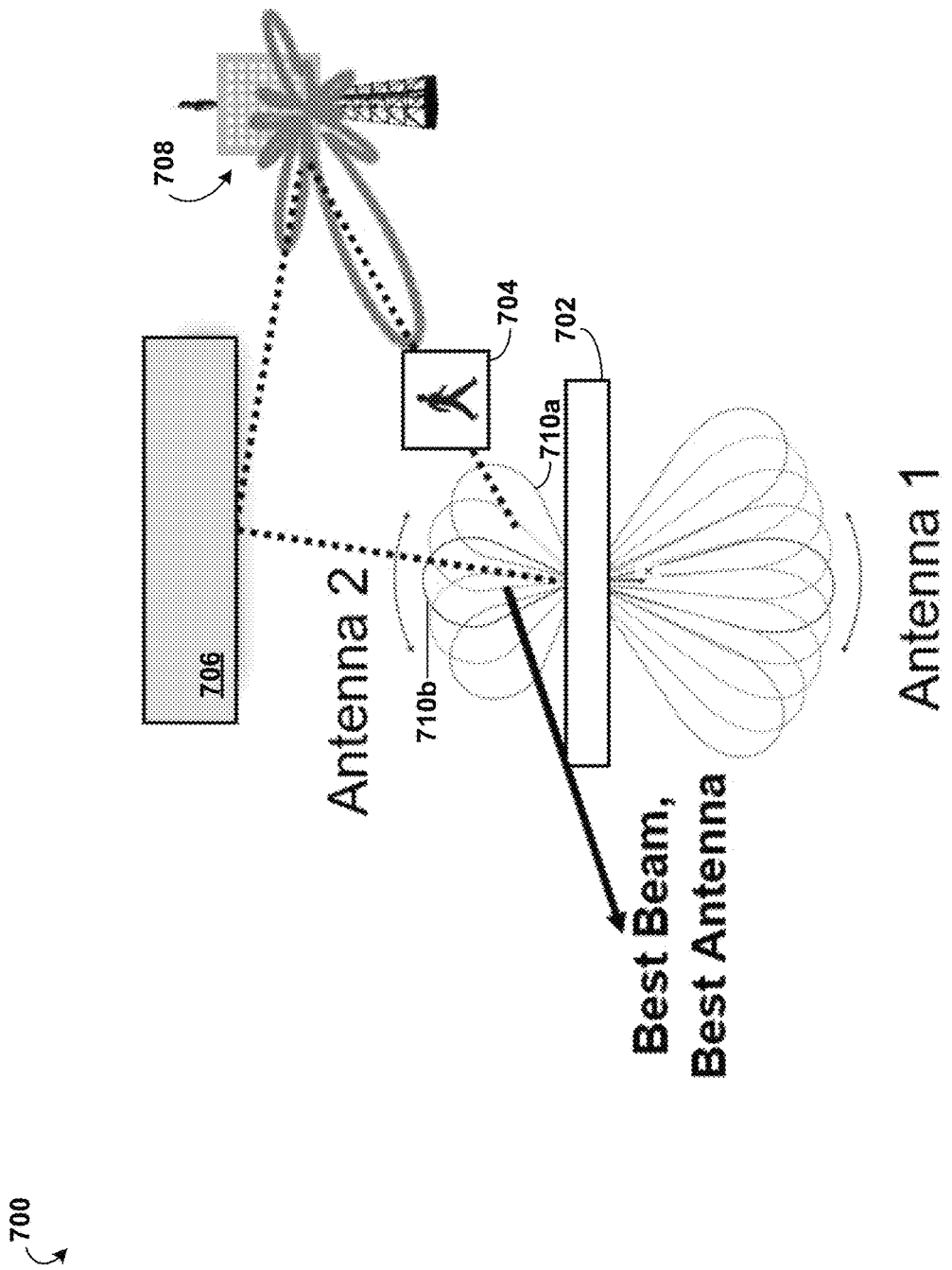
FIG. 6 illustrates an example of selection of one or more of an antenna and a beam based on sensor feedback in accordance with some implementations of the present disclosure.

FIG. 6 illustrates an example environment 700 for selection, by a mobile device 702, of one or more of an antenna and a beam based on sensor feedback in accordance with some implementations of the present disclosure. In this example, the mobile device (e.g., a UE) 702 is communicating with a remote device 708 (e.g., a gNB). The mobile device 702 is static. A first beam 710a of antenna 2 is initially used for communication with the remote device 708 based on a beam scan. Though no motion occurs, the mobile device 702 detects that the performance of the link is degraded. For example, there may be an SNR drop, a delay spread increase, or changes to an AoA, as previously described. This can be the result of a blockage 704, such as a person moving between the mobile device 702 and the remote device 708, during the communication. Thus, the main lobe of the transmitted signal of the remote device 708 is blocked. In response to detecting the change in values of the communications metrics, and in response to also detecting that no motion has occurred, the mobile device 702 finds a replacement beam 710b based on a secondary lobe of the transmitted signal. The secondary lobe is reflected from an object 706 in the environment of the device 702. The AoA indicates that a signal strength is strongest from a different position. The mobile device 702 associates the AoA of the strongest signal to a location in the coverage map and selects beam 710b of antenna 2 as a result.

Figure 7:
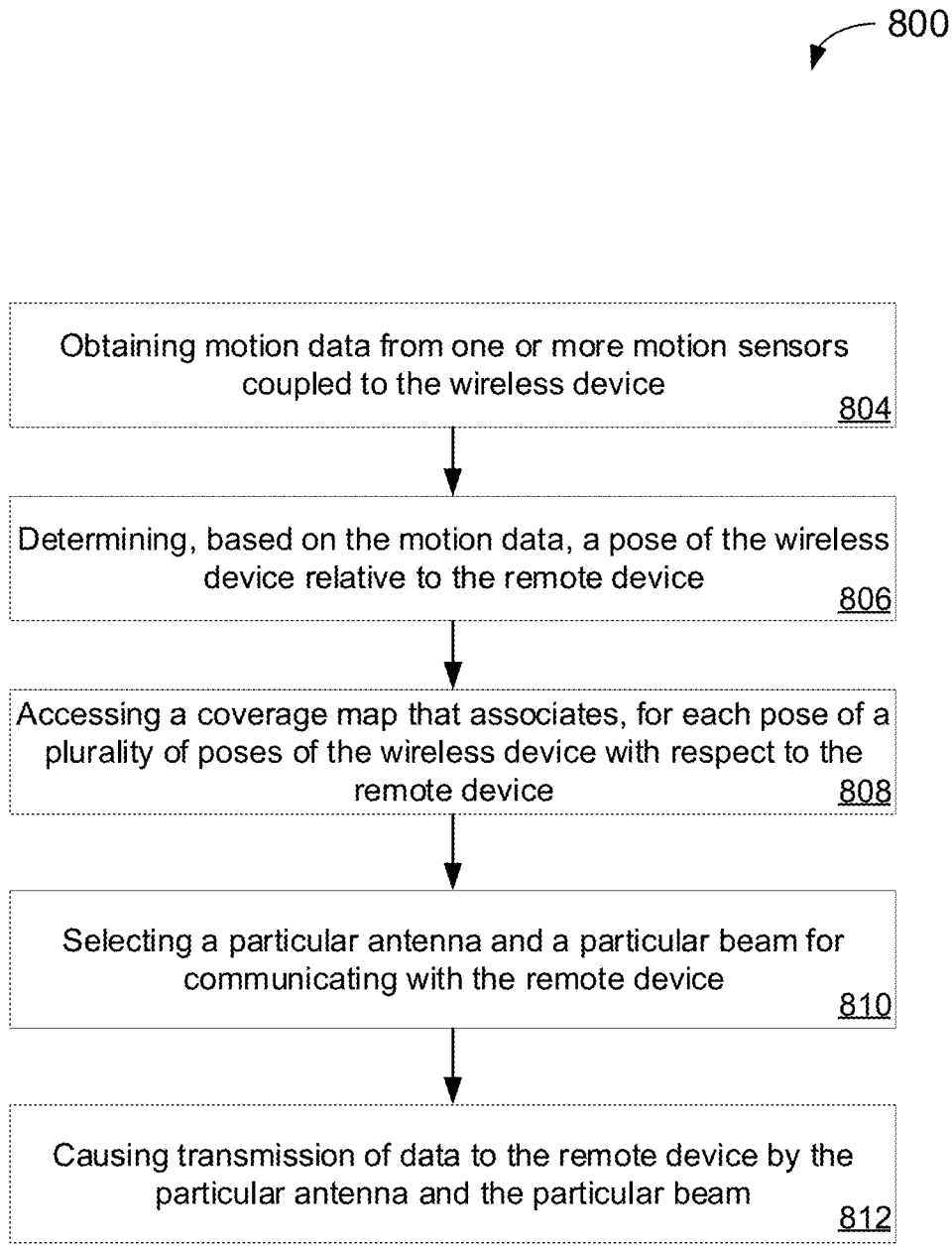
FIG. 7 illustrates an example process for configuration of parameters for selection of a beam, a beam, or both based on sensor feedback in accordance with some implementations of the present disclosure.

FIG. 7 illustrates an example process for configuration of parameters for selection of a beam, a beam, or both based on sensor feedback in accordance with some implementations of the present disclosure. In some examples, the electronic device(s), network(s), system(s), chip(s) or component(s), or portions or implementations thereof, of FIGS. 1-6 may be configured to perform the process 800. The process 800 includes receiving, at a wireless device, a synchronization signal from a remote device. The process 800 includes, in response to receiving the synchronization signal, obtaining (804) motion data from one or more motion sensors coupled to the wireless device, the motion data indicating a change in position or orientation of the wireless device. The process 800 includes determining (806), based on the motion data, a pose of the wireless device relative to the remote device. The process 800 includes accessing (808) a coverage map that associates, for each pose of a plurality of poses of the wireless device with respect to the remote device: an antenna for communicating with the remote device; a beam for communicating with the remote device; or both the antenna and the beam configuration for communicating with the remote device. The process 800 includes selecting (810) a particular antenna and a particular beam for communicating with the remote device. The process 800 includes causing (812) transmission of data to the remote device by the particular antenna and the particular beam.

In some embodiments, the process 800 includes determining an initial pose of the wireless device with respect to the remote device using angle of arrival (AoA) data. The pose of the wireless device relative to the remote device is based on the motion data indicative of the change in the position or the orientation of the wireless device from the initial pose.

In some embodiments, the motion data is indicative of no change to the position or orientation of the wireless device over a period of time. The process 800 includes determining that one or more metrics of a communication channel between the wireless device and the remote device fail to satisfy one or more respective thresholds. The process 800 includes, in response to determining, identifying an angle of arrival (AoA) value of a strongest signal from the remote device. The process 800 includes identifying, from the coverage map, the particular beam and the particular antenna as being associated with the AoA value in the coverage map.

In some embodiments, the one or more metrics include at least one of a signal to noise (SNR) ratio of the synchronization signal, a delay spread value of the synchronization signal, and a magnitude of a change in the AoA of the synchronization signal.

In some embodiments the process 800 includes selecting the one or more respective thresholds by applying training data representing values of the one or more metrics to a machine learning model. The machine learning model is configured to classify the synchronization signal as blocked or unblocked.

In some embodiments, the coverage map indicates that the particular antenna and the particular beam represent the highest gain for causing transmission of data to the remote device or receiving additional data from the remote device.

In some embodiments, the one or more sensors comprise at least an accelerometer, a gyroscope, or both the accelerometer and the gyroscope.

In some embodiments the wireless device and the remote device are configured for mmWave communication using frequency range 2 (FR2).

In some embodiments selecting the particular antenna and the particular beam for communicating with the remote device is performed with a latency of less than 2 milliseconds.

In some embodiments the process 800 includes retrieving motion data periodically to determine if the wireless device is moving or is static.

In some embodiments the wireless device comprises at least three antenna arrays, and wherein each antenna array includes at least 10 beam configurations.

In some embodiments determining, based on the motion data, the pose of the wireless device relative to the remote device includes determining one or more of a translational motion or a rotational motion of the wireless device exceeds a motion threshold. The process 800 includes, in response to determining that the motion threshold is exceeded, accessing the coverage map.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks.

Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

EXAMPLES

Example 1 includes a method, comprising: obtaining motion data from one or more motion sensors coupled to a wireless device, the motion data indicating a change in position or orientation of the wireless device; determining, based on the motion data, a pose of the wireless device relative to a remote device; selecting a particular antenna or a particular beam for communicating with the remote device based on a coverage map that associates, for each pose of a plurality of poses of the wireless device with respect to the remote device: an antenna for communicating with the remote device; a beam for communicating with the remote device; or both the antenna and the beam configuration for communicating with the remote device; and causing transmission or reception of data to or from the remote device by the particular antenna or the particular beam.

Example 2 can include example 1 and further includes determining an initial pose of the wireless device with respect to the remote device using angle of arrival (AoA) data, wherein the pose of the wireless device relative to the remote device is based on the motion data indicative of the change in the position or the orientation of the wireless device from the initial pose.

Example 3 includes any of examples 1-2, wherein the motion data is indicative of no change to the position or orientation of the wireless device over a period of time, and wherein the method further comprises: determining that one or more metrics of a communication channel between the wireless device and the remote device fail to satisfy one or more respective thresholds; in response to determining, identifying an angle of arrival (AoA) value of a strongest signal from the remote device; and identifying, from the coverage map, the particular beam and the particular antenna as being associated with the AoA value in the coverage map.

Example 4 can include any of examples 1-3, wherein the one or more metrics include at least one of a signal to noise (SNR) ratio of a signal received from the remote device, a delay spread value of the signal, and a magnitude of a change in the AoA of the signal.

Example 5 can include any of examples 1-4, wherein the coverage map indicates that the particular antenna and the particular beam represent the highest gain for causing transmission of data to the remote device or receiving additional data from the remote device.

Example 6 can include any of examples 1-5, wherein the one or more motion sensors comprise at least an accelerometer, a gyroscope, or both the accelerometer and the gyroscope.

Example 7 can include any of examples 1-6, wherein the wireless device and the remote device are configured for mmWave communication using frequency range 2 (FR2).

Example 8 can include any of examples 1-7, wherein selecting the particular antenna and the particular beam for communicating with the remote device is performed with a latency of less than 2 milliseconds.

Example 9 can include any of examples 1-8, further comprising retrieving motion data periodically to determine if the wireless device is moving or is static.

Example 10 can include any of examples 1-9, wherein the wireless device comprises at least three antenna arrays, and wherein each antenna array includes at least 10 beam configurations.

Example 11 can include any of examples 1-10, wherein determining, based on the motion data, the pose of the wireless device relative to the remote device comprises: determining one or more of a translational motion or a rotational motion of the wireless device exceeds a motion threshold; and in response to determining that the motion threshold is exceeded, accessing the coverage map.

Example 12 can include any of examples 1-11, further comprising: comparing the change in position or orientation of the wireless device to a threshold change value; and in response to the comparing, accessing the coverage map when the change exceeds the threshold.

Example 13 can include any of examples 1-12, further comprising: detecting that a signal strength received from the remote device is below a threshold signal strength; and in response to detecting, obtaining the motion data.

Example 14 can include any of examples 1-13, further comprising: selecting a particular antenna and or a particular beam for communicating with the remote device based on the coverage map; and causing transmission or reception of data to or from the remote device by the particular antenna and the particular beam.

Example 15 includes a wireless device, comprising: at least one motion sensor; one or more antenna arrays each configured for at least two beam configurations; one or more processors; and a non-transitory computer-readable storage medium storing instructions which, when executed by the one or more processors, cause the one or more processors to perform operations comprising: obtaining motion data from the at least one motion sensor, the motion data indicating a change in position or orientation of the wireless device; determining, based on the motion data, a change for a pose of the wireless device relative to a remote device; selecting a particular antenna and a particular beam for communicating with the remote device based on a coverage map that associates, for each pose of a plurality of poses of the wireless device with respect to the remote device: an antenna array of the one or more antenna arrays for communicating with the remote device; a beam for communicating with the remote device; or both the antenna and the beam for communicating with the remote device; and causing transmission of data to the remote device by the particular antenna and the particular beam.

Example 16 can include example 15, wherein the operations further comprise: determining an initial pose of the wireless device with respect to the remote device using angle of arrival (AoA) data, wherein the pose of the wireless device relative to the remote device is based on the motion data indicative of the change in the position or the orientation of the wireless device from the initial pose.

Example 17 can include any of examples 15-16, wherein the motion data is indicative of no change to the position or orientation of the wireless device over a period of time, and wherein the operations further comprise: determining that one or more metrics of a communication channel between the wireless device and the remote device fail to satisfy one or more respective thresholds; in response to determining, identifying an angle of arrival (AoA) value of a strongest signal from the remote device; and identifying, from the coverage map, the particular beam and the particular antenna as being associated with the AoA value in the coverage map.

Example 18 can include any of examples 15-17, wherein the one or more metrics include at least one of a signal to noise (SNR) ratio of a signal from the remote device, a delay spread value of the signal, and a magnitude of a change in the AoA of the signal.

Example 19 can include any of examples 15-18, wherein the coverage map indicates that the particular antenna and the particular beam represent the highest gain for causing transmission of data to the remote device or receiving additional data from the remote device.

Example 20 can include any of examples 15-19, wherein the one or more motion sensors comprise at least an accelerometer, a gyroscope, or both the accelerometer and the gyroscope.

Example 21 can include any of examples 15-20, wherein the wireless device and the remote device are configured for mmWave communication using frequency range 2 (FR2).

Example 22 can include any of examples 15-21, the operations further comprising: comparing the change in position or orientation of the wireless device to a threshold change value; in response to the comparing, accessing the coverage map when the change exceeds the threshold.

Example 23 can include any of examples 15-22, the operations further comprising: detecting that a signal strength received from the remote device is below a threshold signal strength; and in response to detecting, obtaining the motion data.

Example 24 can include any of examples 15-23, the operations further comprising: selecting a particular antenna and or a particular beam for communicating with the remote device based on the coverage map; and causing transmission or reception of data to or from the remote device by the particular antenna and the particular beam.

Example 25 can include a processor for a user equipment (UE), the processor comprising: circuitry configured to communicate with a remote device; and circuitry to execute one or more instructions that, when executed, cause the processor to perform operations comprising: obtaining motion data from one or more motion sensors coupled to a wireless device, the motion data indicating a change in position or orientation of the wireless device; determining, based on the motion data, a pose of the wireless device relative to a remote device; selecting a particular antenna or a particular beam for communicating with the remote device based on a coverage map that associates, for each pose of a plurality of poses of the wireless device with respect to the remote device: an antenna for communicating with the remote device; a beam for communicating with the remote device; or both the antenna and the beam configuration for communicating with the remote device; and causing transmission or reception of data to or from the remote device by the particular antenna or the particular beam.

Example 26 can include example 25, the operations further comprising: determining an initial pose of the wireless device with respect to the remote device using angle of arrival (AoA) data, wherein the pose of the wireless device relative to the remote device is based on the motion data indicative of the change in the position or the orientation of the wireless device from the initial pose.

Example 27 can include any of examples 25-26, wherein the motion data is indicative of no change to the position or orientation of the wireless device over a period of time, and the operations further comprising: determining that one or more metrics of a communication channel between the wireless device and the remote device fail to satisfy one or more respective thresholds; in response to determining, identifying an angle of arrival (AoA) value of a strongest signal from the remote device; and identifying, from the coverage map, the particular beam and the particular antenna as being associated with the AoA value in the coverage map.

Example 28 can include any of examples 25-27, wherein the one or more metrics include at least one of a signal to noise (SNR) ratio of a signal received from the remote device, a delay spread value of the signal, and a magnitude of a change in the AoA of the signal.

Example 29 can include any of examples 25-28, wherein the coverage map indicates that the particular antenna and the particular beam represent the highest gain for causing transmission of data to the remote device or receiving additional data from the remote device.

Example 30 can include any of examples 25-29, wherein the one or more motion sensors comprise at least an accelerometer, a gyroscope, or both the accelerometer and the gyroscope.

Example 31 can include any of examples 25-30, wherein the wireless device and the remote device are configured for mmWave communication using frequency range 2 (FR2).

Example 32 can include any of examples 25-31, wherein selecting the particular antenna and the particular beam for communicating with the remote device is performed with a latency of less than 2 milliseconds.

Example 33 can include any of examples 25-32, the operations further comprising retrieving motion data periodically to determine if the wireless device is moving or is static.

Example 34 can include any of examples 25-33, wherein the wireless device comprises at least three antenna arrays, and wherein each antenna array includes at least 10 beam configurations.

Example 35 can include any of examples 25-34, wherein determining, based on the motion data, the pose of the wireless device relative to the remote device comprises: determining one or more of a translational motion or a rotational motion of the wireless device exceeds a motion threshold; and in response to determining that the motion threshold is exceeded, accessing the coverage map.

Example 36 can include any of examples 25-35, the operations further comprising: comparing the change in position or orientation of the wireless device to a threshold change value; and in response to the comparing, accessing the coverage map when the change exceeds the threshold.

Example 37 can include any of examples 25-36, the operations further comprising: detecting that a signal strength received from the remote device is below a threshold signal strength; and in response to detecting, obtaining the motion data.

Example 38 can include any of examples 25-37, the operations further comprising: selecting a particular antenna and or a particular beam for communicating with the remote device based on the coverage map; and causing transmission or reception of data to or from the remote device by the particular antenna and the particular beam.

Example 39 may include a signal as described in or related to any of examples 1-67, or portions or parts thereof.

Example 40 may include a datagram, information element, packet, frame, segment, PDU, or message as described in or related to any of examples 1-68, or portions or parts thereof, or otherwise described in the present disclosure.

Example 41 may include a signal encoded with data as described in or related to any of examples 1-38, or portions or parts thereof, or otherwise described in the present disclosure.

Example 42 may include a signal encoded with a datagram, IE, packet, frame, segment, PDU, or message as described in or related to any of examples 1-38, or portions or parts thereof, or otherwise described in the present disclosure.

Example 43 may include an electromagnetic signal carrying computer-readable instructions, wherein execution of the computer-readable instructions by one or more processors is to cause the one or more processors to perform the method, techniques, or process as described in or related to any of examples 1-38, or portions thereof.

Example 44 may include a computer program comprising instructions, wherein execution of the program by a processing element is to cause the processing element to carry out the method, techniques, or process as described in or related to any of examples 1-38, or portions thereof.

Example 45 may include a signal in a wireless network as shown and described herein.

Example 46 may include a method of communicating in a wireless network as shown and described herein.

Example 47 may include a system for providing wireless communication as shown and described herein.

Example 48 may include a device for providing wireless communication as shown and described herein.

What is claimed is:

1. A method, comprising:
    obtaining motion data from one or more motion sensors coupled to a wireless device, the motion data indicating a change in position or orientation of the wireless device;
    determining a pose of the wireless device in a coverage map with relative to a remote device using angle of arrival (AoA) data, wherein the pose of the wireless device relative to the remote device is based on the motion data indicative of the change in the position or the orientation of the wireless device from the pose;
    selecting a particular antenna or a particular beam for communicating with the remote device based on the coverage map that associates, for each pose of a plurality of poses of the wireless device relative to the remote device:
        an antenna for communicating with the remote device;
        a beam for communicating with the remote device; or
        both the antenna and beam configuration for communicating with the remote device; and
    generating one or more signals for transmission to or reception from the remote device by the particular antenna or the particular beam.

2. The method of claim 1, wherein the motion data is indicative of no change to the position or orientation of the wireless device over a period of time, and wherein the method further comprises:
    determining that one or more metrics of a signal associated with a communication channel between the wireless device and the remote device fail to satisfy one or more respective thresholds;
    in response to determining, identifying an angle of arrival (AoA) value of a strongest signal from the remote device; and
    identifying, from the coverage map, the particular beam and the particular antenna as being associated with the strongest signal in the coverage map based on the AoA value of the strongest signal.

3. The method of claim 2, wherein the one or more metrics include at least one of a signal to noise (SNR) ratio of a signal received from the remote device, a delay spread value of the signal, and a magnitude of a change in an AoA value of the signal associated with the communication channel.

4. The method of claim 1, wherein the coverage map indicates that the particular antenna and the particular beam represent a highest gain for generating the one or more signals for transmission to the remote device or for receiving one or more signals from the remote device.

5. The method of claim 1, wherein the one or more motion sensors comprise at least an accelerometer, a gyroscope, or both the accelerometer and the gyroscope.

6. The method of claim 1, wherein the wireless device and the remote device are configured for mmWave communication using frequency range 2 (FR2).

7. The method of claim 1, wherein selecting the particular antenna and the particular beam for communicating with the remote device is performed with a latency of less than 2 milliseconds between obtaining the motion data and generating the one or more signals.

8. The method of claim 1, further comprising retrieving the motion data periodically to determine if the wireless device is moving or is static.

9. The method of claim 1, wherein the wireless device comprises at least three antenna arrays, and wherein each antenna array includes at least 10 beam configurations.

10. The method of claim 1, wherein determining, based on the motion data, the pose of the wireless device relative to the remote device comprises:
   determining that one or more of a translational motion or a rotational motion of the wireless device exceeds a motion threshold; and
   in response to determining that the motion threshold is exceeded, accessing the coverage map.

11. The method of claim 1, further comprising:
   comparing the change in position or orientation of the wireless device to a threshold change value; and
   in response to the comparing, accessing the coverage map when the change exceeds the threshold change value.

12. The method of claim 1, further comprising:
   detecting that a signal strength received from the remote device is below a threshold signal strength; and
   in response to detecting, obtaining the motion data.

13. The method of claim 1, further comprising:
   selecting a particular antenna and or a particular beam for communicating with the remote device based on the coverage map; and
   generating one or more signals for transmission to or reception from the remote device by the particular antenna or the particular beam.

14. A wireless device, comprising:
   one or more motion sensors;
   one or more antenna arrays each configured for at least two beam configurations;
   a one or more processors configured to perform operations comprising:
      obtaining motion data from the one or more motion sensors, the motion data indicating a change in position or orientation of the wireless device;
      determining a pose of the wireless device in a coverage map relative to a remote device using angle of arrival (AoA) data, wherein the pose of the wireless device relative to the remote device is based on the motion data indicative of the change in the position or the orientation of the wireless device from the pose;
      selecting a particular antenna and a particular beam for communicating with the remote device based on the coverage map that associates, for each pose of a plurality of poses of the wireless device relative to the remote device:
         an antenna array of the one or more antenna arrays for communicating with the remote device;
         a beam for communicating with the remote device; or
         both the antenna array and the beam for communicating with the remote device; and
      generating one or more signals for transmission to or reception from the remote device by the particular antenna or the particular beam.

15. The wireless device of claim 14, wherein the motion data is indicative of no change to the position or orientation of the wireless device over a period of time, and wherein the operations further comprise:
   determining that one or more metrics of a signal associated with a communication channel between the wireless device and the remote device fail to satisfy one or more respective thresholds;
   in response to determining, identifying an angle of arrival (AoA) value of a strongest signal from the remote device; and
   identifying, from the coverage map, the particular beam and the particular antenna as being associated with the strongest signal in the coverage map based on the AoA value of the strongest signal.

16. The wireless device of claim 15, wherein the one or more metrics include at least one of a signal to noise (SNR) ratio of a signal from the remote device, a delay spread value of the signal, and a magnitude of a change in the AoA value of the strongest signal.

17. The wireless device of claim 14, wherein the coverage map indicates that the particular antenna and the particular beam represent a highest gain for generating the one or more signals for transmission to the remote device or for receiving one or more signals from the remote device.

18. The wireless device of claim 14, wherein the one or more motion sensors comprise at least an accelerometer, a gyroscope, or both the accelerometer and the gyroscope.

19. The wireless device of claim 14, wherein the wireless device and the remote device are configured for mmWave communication using frequency range 2 (FR2).

20. The wireless device of claim 14, the operations further comprising:
   comparing the change in position or orientation of the wireless device to a threshold change value; and
   in response to the comparing, accessing the coverage map when the change exceeds the threshold change value.

21. The wireless device of claim 14, the operations further comprising:
   detecting that a signal strength received from the remote device is below a threshold signal strength; and
   in response to detecting, obtaining the motion data.

22. The wireless device of claim 14, the operations further comprising:
   selecting a particular antenna and or a particular beam for communicating with the remote device based on the coverage map; and
   generating one or more signals for transmission to or reception from the remote device by the particular antenna or the particular beam.

23. An apparatus for wireless communication, comprising:

circuitry to execute one or more instructions that, when executed, cause one or more processors to perform operations comprising:

obtaining motion data from one or more motion sensors coupled to a wireless device, the motion data indicating a change in position or orientation of the wireless device;

determining a pose of the wireless device in a coverage map with relative to a remote device using angle of arrival (AoA) data, wherein the pose of the wireless device relative to the remote device is based on the motion data indicative of the change in the position or the orientation of the wireless device from the pose;

selecting a particular antenna or a particular beam for communicating with the remote device based on the coverage map that associates, for each pose of a plurality of poses of the wireless device relative to the remote device:
 an antenna for communicating with the remote device;
 a beam for communicating with the remote device; or
 both the antenna and beam configuration for communicating with the remote device; and generating one or more signals for transmission to or reception from the remote device by the particular antenna or the particular beam.

24. The processor apparatus of claim 23, wherein the motion data is indicative of no change to the position or orientation of the wireless device over a period of time, and the operations further comprising:

determining that one or more metrics of a signal associated with a communication channel between the wireless device and the remote device fail to satisfy one or more respective thresholds;

in response to determining, identifying an angle of arrival (AoA) value of a strongest signal from the remote device; and identifying, from the coverage map, the particular beam and the particular antenna as being associated with the strongest signal in the coverage map based on the AoA value of the strongest signal.

25. The apparatus of claim 24, wherein the one or more metrics include at least one of a signal to noise (SNR) ratio of a signal received from the remote device, a delay spread value of the signal, and a magnitude of a change in the AoA value of the strongest signal.

26. The apparatus of claim 23, wherein the coverage map indicates that the particular antenna and the particular beam represent a highest gain for generating the one or more signals for transmission to the remote device or for receiving one or more signals from the remote device.

27. The apparatus of claim 23, wherein the one or more motion sensors comprise at least an accelerometer, a gyroscope, or both the accelerometer and the gyroscope.

28. The apparatus of claim 23, wherein the wireless device and the remote device are configured for mmWave communication using frequency range 2 (FR2).

29. The apparatus of claim 23, wherein selecting the particular antenna and the particular beam for communicating with the remote device is performed with a latency of less than 2 milliseconds between obtaining the motion data and generating the one or more signals.

30. The apparatus of claim 23, the operations further comprising retrieving motion data periodically to determine if the wireless device is moving or is static.

31. The processor apparatus of claim 23, wherein the wireless device comprises at least three antenna arrays, and wherein each antenna array includes at least 10 beam configurations.

32. The apparatus of claim 23, wherein determining, based on the motion data, the pose of the wireless device relative to the remote device comprises:

determining that one or more of a translational motion or a rotational motion of the wireless device exceeds a motion threshold; and in response to determining that the motion threshold is exceeded, accessing the coverage map.

33. The apparatus of claim 23, the operations further comprising:

comparing the change in position or orientation of the wireless device to a threshold change value; and in response to the comparing, accessing the coverage map when the change exceeds the threshold change value.

34. The apparatus of claim 23, the operations further comprising:

detecting that a signal strength received from the remote device is below a threshold signal strength; and in response to detecting, obtaining the motion data.

35. The apparatus of claim 23, the operations further comprising:

selecting a particular antenna and or a particular beam for communicating with the remote device based on the coverage map; and generating one or more signals for transmission to or reception from the remote device by the particular antenna and the particular beam.

36. The apparatus of claim 23, wherein the apparatus is a processor.

37. The apparatus of claim 23, wherein the apparatus is a user equipment.

* * * * *

UNITED STATES PATENT AND TRADEMARK OFFICE
CERTIFICATE OF CORRECTION

PATENT NO. : 12,185,123 B2
APPLICATION NO. : 17/572145
DATED : December 31, 2024
INVENTOR(S) : Ioannis Pefkianakis et al.

Page 1 of 1

It is certified that error appears in the above-identified patent and that said Letters Patent is hereby corrected as shown below:

In the Claims

Column 27, Line 56, In Claim 14, after "configurations;" insert -- and --;

Column 29, Line 30, In Claim 24, before "apparatus" delete "processor";

Column 30, Line 16, In Claim 31, before "apparatus" delete "processor".

Signed and Sealed this
Fourth Day of March, 2025

Coke Morgan Stewart
*Acting Director of the United States Patent and Trademark Office*